United States Patent
Yu et al.

(10) Patent No.: US 11,948,340 B2
(45) Date of Patent: Apr. 2, 2024

(54) DETECTING OBJECTS IN VIDEO FRAMES USING SIMILARITY DETECTORS

(71) Applicant: Intel Corporation, Santa Clara, CA (US)

(72) Inventors: Kun Yu, Shanghai (CN); Ciyong Chen, Shanghai (CN); Xiaotian Guo, Hefei (CN); Yan Hao, Shanghai (CN); Hui Li, Shanghai (CN); Lu Li, Shanghai (CN); Jianguo Pei, Shanghai (CN); Zhi Yong Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 17/255,331

(22) PCT Filed: Sep. 7, 2018

(86) PCT No.: PCT/CN2018/104651
§ 371 (c)(1),
(2) Date: Dec. 22, 2020

(87) PCT Pub. No.: WO2020/047854
PCT Pub. Date: Mar. 12, 2020

(65) Prior Publication Data
US 2021/0271923 A1 Sep. 2, 2021

(51) Int. Cl.
*G06V 10/25* (2022.01)
*G06F 18/21* (2023.01)
(Continued)

(52) U.S. Cl.
CPC ............. *G06V 10/25* (2022.01); *G06F 18/21* (2023.01); *G06F 18/22* (2023.01); *G06N 3/045* (2023.01);
(Continued)

(58) Field of Classification Search
CPC ........ G06V 10/82; G06V 10/62; G06V 10/25; G06V 10/761; G06V 20/46; G06V 20/48;
(Continued)

(56) References Cited

U.S. PATENT DOCUMENTS

2008/0226174 A1 9/2008 Hua et al.
2009/0141940 A1 6/2009 Zhao et al.
(Continued)

FOREIGN PATENT DOCUMENTS

CN 105354543 2/2016
CN 108182693 6/2018

OTHER PUBLICATIONS

Yang, Longchao, et al. "Robust real-time visual object tracking via multi-scale fully convolutional Siamese networks." 2017 International Conference on Digital Image Computing: Techniques and Applications (DICTA). IEEE, 2017. (Year: 2017).*
(Continued)

*Primary Examiner* — Vu Le
*Assistant Examiner* — Tracy Mangialaschi
(74) *Attorney, Agent, or Firm* — Hanley, Flight & Zimmerman, LLC

(57) ABSTRACT

An example apparatus for detecting objects in video frames includes a receiver to receive a plurality of video frames from a video camera. The apparatus also includes a first still image object detector to receive a first frame of the plurality of video frames and calculate localization information and confidence information for each potential object patch in the first frame. The apparatus further includes a second still image object detector to receive an adjacent frame of the plurality of video frames adjacent to the first frame and calculate localization information and confidence information for each potential object patch in the adjacent frame. The apparatus includes a similarity detector trained to detect
(Continued)

paired patches between the first frame and the adjacent frame based on a comparison of the detected potential object patches. The apparatus further includes an enhancer to modify a prediction result for a paired patch in the adjacent frame to a prediction result of a corresponding paired patch in the first frame including a higher confidence score than the prediction result of the paired patch in the adjacent frame.

24 Claims, 8 Drawing Sheets

(51) Int. Cl.
    *G06F 18/22*     (2023.01)
    *G06N 3/045*     (2023.01)
    *G06V 10/62*     (2022.01)
    *G06V 10/74*     (2022.01)
    *G06V 10/82*     (2022.01)
    *G06V 20/40*     (2022.01)
    *G06V 20/52*     (2022.01)

(52) U.S. Cl.
    CPC ............ *G06V 10/62* (2022.01); *G06V 10/761* (2022.01); *G06V 10/82* (2022.01); *G06V 20/46* (2022.01); *G06V 20/48* (2022.01); *G06V 20/52* (2022.01)

(58) Field of Classification Search
    CPC .... G06V 20/52; G06V 2201/07; G06F 18/21; G06F 18/22; G06N 3/045
    See application file for complete search history.

(56) References Cited

U.S. PATENT DOCUMENTS

2016/0343146 A1* 11/2016 Brown ................... G06V 20/53
2017/0344808 A1   11/2017 El-Khamy et al.
2018/0129934 A1*  5/2018 Tao ........................ G06N 3/084

OTHER PUBLICATIONS

Bae, Seung-Hwan, and Kuk-Jin Yoon. "Confidence-based data association and discriminative deep appearance learning for robust online multi-object tracking." IEEE transactions on pattern analysis and machine intelligence 40.3 (2017): 595-610. (Year: 2017).*

International Searching Authority, "International Search Report," mailed in connection with International Patent Application No. PCT/CN2018/104651, dated Mar. 27, 2019, 4 pages.

International Searching Authority, "Written Opinion," mailed in connection with International Patent Application No. PCT/CN2018/104651, dated Mar. 27, 2019, 4 pages.

European Patent Office, "Extended European Search Report," issued in EP Application No. 18932497.3, dated Mar. 18, 2022, 14 pages.

European Patent Office, "Communication pursuant to Article 94(3) EPC," issued in European Application No. 18932497.3, dated Feb. 9, 2024, 5 pages.

International Searching Authority, "International Preliminary Report on Patentability," issued in connection with PCT No. PCT/CN2018/104651, dated Mar. 9, 2021, 4 pages.

* cited by examiner

DETECTING OBJECTS IN VIDEO FRAMES USING SIMILARITY DETECTORS

BACKGROUND

Object detection is used in automatic driving, robot vision, security field, etc. Object detection may include determining what objects are in a picture or video frame and where the detected objects are located. Object detection can be divided into still image object detection and object detection from video categories.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
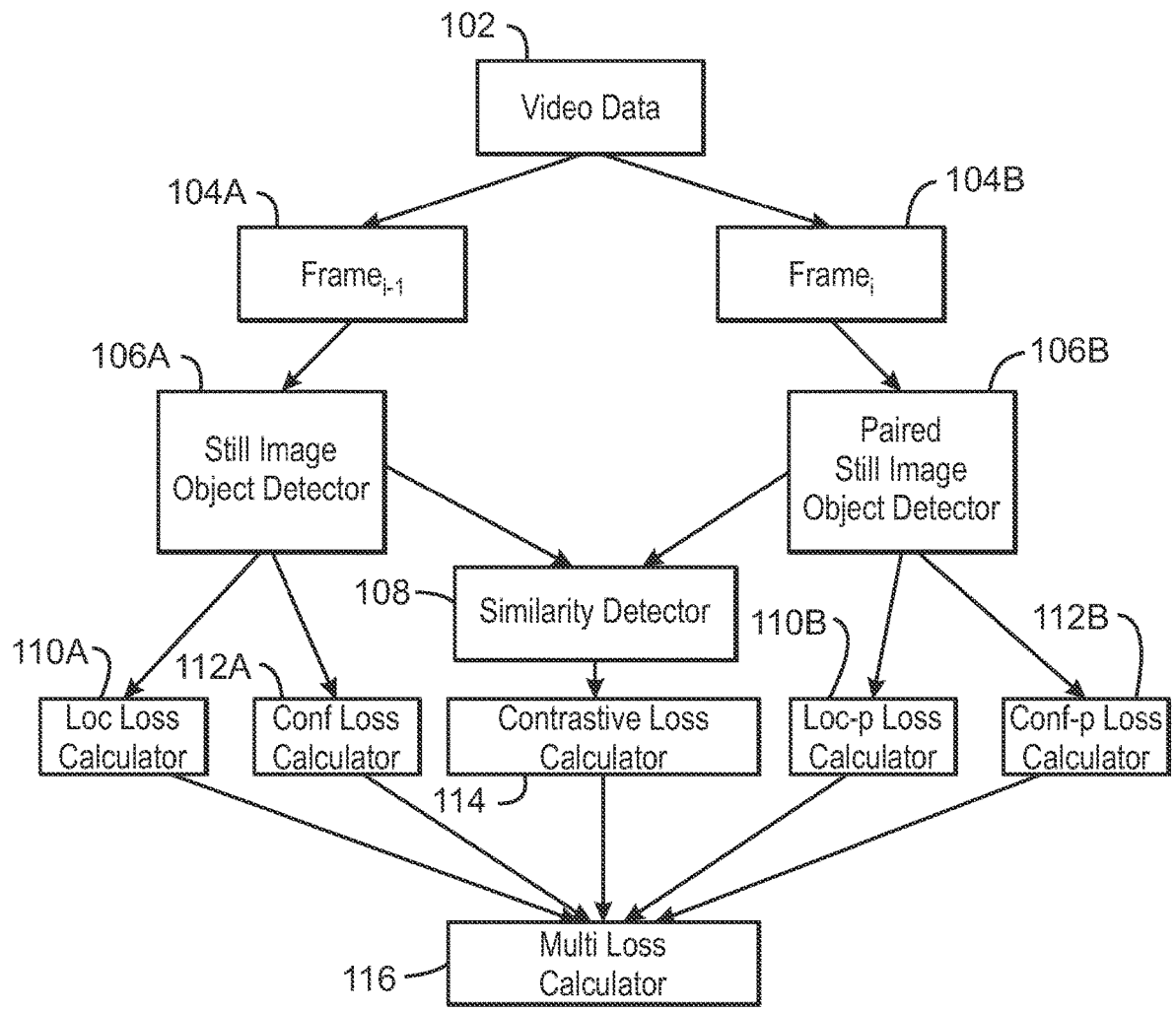
FIG. 1 is a block diagram illustrating an example system for training a neural network to detect objects in video frames.

As discussed above, object detection can include still image object detection and object detection from video categories. In some examples, a still image object detector can be used to detect objects in frames from videos. However, motion blur, video defocus, partial occlusion, rare poses, etc. may pose challenges in object detection from video as compared with still image object detection. For example, a still image object detector may be able to detect an object in some frames of a video, but not be able to detect the object in other frames due to blur, lack of focus, partial occlusion, or rare poses.

The present disclosure relates generally to techniques for detecting objects in video frames. Specifically, the techniques described herein include an apparatus, method and system for detecting objects in video frames using similarity detectors. An example apparatus includes a receiver to receive a plurality of video frames from a video camera. The apparatus includes a first still image object detector to receive a first frame of the plurality of video frames and calculate localization information and confidence information for each potential object patch in the first frame. For example, the localization information can include predicted bounding box coordinates. The confidence information can include one or more confidence scores for one or more object types or classifications. The apparatus further includes a second still image object detector to receive a second adjacent frame of the plurality of video frames adjacent to the first frame and calculate localization information and confidence information for each potential object patch in the adjacent frame. As used herein, an adjacent frame refers frame that has been consecutively captured to another frame. The apparatus also includes a similarity detector trained to detect paired patches between the first frame and the adjacent frame based on a comparison of the detected potential object patches. The apparatus also further includes an enhancer to modify a prediction result for a paired patch in the adjacent frame to a prediction result of a corresponding paired patch in the first frame including a higher confidence score than the prediction result of the paired patch in the adjacent frame.

The techniques described herein thus enable objects to be detected in frames that would not be detected using still image object detectors. For example, the objects may be detected in frames despite partial occlusion, motion blur, video defocus, rare poses, or other issues that may make detecting the object difficult in a still image object detector. Thus, the techniques herein improve the rate at which objects are detected in video frames, particularly with video including motion blur, partial occlusion of objects, video defocus, or objects with rare poses. Moreover, the techniques may be used in a variety of applications. For example, object detection is widely used in automatic driving, scene understanding, robot vision, and the security field, among other applications.

FIG. 1 is a block diagram illustrating an example system for training a neural network to detect objects in video frames. The example system is referred to generally by the reference number 100 and can be implemented in the computing device 600 below in FIG. 6 using the method 300 of FIG. 3 below.

The example system 100 includes a video data 102. For example, the video data may be training data including one or more objects with frames in which the objects are at least partially occluded. The system 100 includes a pair of frames 104A, 104B from the video data 102. For example, the frames 104A, 104B may be consecutive frames from a video stream. The system 100 further includes a pair of still image object detectors including a still image object detector 106A and a paired still image object detector 106B shown receiving frame$_{i-1}$ 104A and frame$_i$ 104B, respectively. For example, the still image object detector 106A and the paired still image object detector 106B may be implemented using the Single Shot MultiBox detector (SSD), as first published in December 2015, version 5 published in December 2016, by Liu et al. In some examples, the still image object detector 106A and the paired still image object detector 106B may alternatively be implemented using the You Only Look Once (YOLO) model (released 2016), YOLOv2 model (released 2017), or YOLOv3 model (released 2018), by Joseph Redmon. Alternatively, in some examples, the still image object detector 106A and the paired still image object detector 106B may alternatively be implemented using a region proposal network ( ) detectors such as the Faster R-CNN (version 1 released in June 2015, last revised version 3 Jan. 2016, by Ren et al.). In some examples, the still image object detector 106A and the paired still image object detector 106B may alternatively be implemented using the region-based fully convolutional network (R-FCN) detector (version 1 released May 2016 or version 2 released June 2016, by Dai et. al). The system 100 also includes a similarity detector 108 that is communicatively coupled to the still image object detector 106A and the paired still image object detector 106B. In some examples, the similarity detector 108 may be the Siamese convolutional neural network (Siamese-CNN) (versions 1 and 2 released April 2016, version 3 released August 2016, by Leal-Taixé et al.). The system 100 includes a localization (loc) loss calculator 110A and a confidence (conf) loss calculator 112A communicatively coupled to the still image object detector 106A and a paired localization (loc-p) loss calculator 110b and paired confidence (conf-p) loss calculator 112b communicatively coupled to the paired still image object detector 106b. The system 100 also further includes a contrastive loss calculator 114 communicatively coupled to the Siamese-CNN similarity detector 108. The system 100 further includes a multi-loss calculator 116 communicatively coupled to the loc loss calculator 110A, the conf loss calculator 112A, the contrastive loss calculator 114, the loc-p loss calculator 110b, and the conf-p loss calculator 112B.

As shown in FIG. 1, in particular, the training objective may be to minimize the sum of a similarity loss between two object patches (contrastive loss), the localization loss for object bounding box detection (loc loss), and the confidence loss for object classification (conf loss). In some examples, before training is performed, default bounding boxes corresponding to a ground truth detection may first be determined. As used herein, a default bounding box refers to a kind of patch proposal policy used to find out the detection region for an object. Default bounding boxes may also be referred to as default boxes, prior boxes or anchor boxes. In some examples, the default bounding box having a higher Jaccard overlap with the ground truth bounding boxes may be referred to as a positive default bounding box. For example, positive default bounding boxes may have a Jaccard overlap with the ground truth bounding box that is more than a predetermined threshold. As one example, the predetermined threshold may be 0.5. Otherwise, the default bounding box is negative. The Jaccard overlap J may be calculated using the equation:

$$J(S_{box1}, S_{box2}) = \frac{S_{box1} \cap S_{box2}}{S_{box1} \cup S_{box2}} \quad \text{Eq. 1}$$

where S is the area of each respective bounding box, and box1 is the default bounding box and box2 is the ground truth bounding box. Ground truth bounding boxes, as used herein, refer to a label of a bounding box in the dataset, and may also be referred to as the ground truth box. Thus, negative default bounding boxes may have a Jaccard overlap with Ground truth bounding box that is less than the predetermined threshold.

In one embodiment, the training objective can be based on the training of SSD networks. For example, $x_{ij}^p$, ={1, 0} and $y_{ij}^p$={1, 0} may be indicators for matching the i-th default bounding box to the j-th ground truth bounding box of category p in the previous and reference frame. Given predicted boxes in the previous and reference frame of $l_{f-1}$ and $l_f$, and ground truth bounding boxes in the previous and reference frame of $g_{f-1}$ and $g_f$, and corresponding default bounding boxes in the previous and reference frame of $d_{f-1}$ and $d_f$, then the overall objective loss function L can be calculated by the multi-loss calculator 116 as a weighted sum of the localization loss (loc loss), the contrastive loss (contra loss) and the confidence loss (conf loss) using the equation:

$$L(x, y, c, e, l_{f-1}, l_f, g_{f-1}, g_f, d_{f-1}, d_f) = \quad \text{Eq. 2}$$
$$(L_{conf}(x, c) + \alpha * L_{loc}(x, l_f - 1, g_{f-1})) +$$
$$\frac{1}{N}(L_{conf}(y, e) + \alpha * L_{loc}(y, l_f, g_f)) + \frac{1}{\theta MN}\beta * L_{contra}(d_{f-1}, d_f)$$

where M and N are the numbers of matched default boxes in the previous and reference frame. If M=0 and N !=0, then the trainer may only consider $L_{conf}$ and $L_{loc}$ for the reference frame. If N=0 and M !=0, then the trainer may only consider $L_{conf}$ and $L_{loc}$ for the previous frame. If M=0 and N=0, then the trainer may set the overall loss to 0. In some examples, the localization loss can be a smooth L1 loss between the predicted box (l) and the ground truth bounding box (g) parameters.

In some examples, since $L_{loc}$ (x, lf-1, gf-1) and $L_{loc}$ (y, lf, gf)) are the same formula, while $L_{conf}$ (x, c) and $L_{conf}$ (y, e) are also the same formula, $L_{loc}$ (x, l, g) can be calculated using the equation:

$$L_{loc}(x, l, g) = \sum_{i \in Pos}^{N} \sum_{m \in \{cx, cy, w, h\}} x_{ij}^k \text{smooth}_{L1}(l_i^m - \hat{g}_j^m) + \underset{i \in Neg}{0} \quad \text{Eq. 3}$$
$$\hat{g}_j^{cx} = (g_j^{cx} - d_i^{cx})/d_i^w$$
$$\hat{g}_j = (\hat{g}_j^{cy} - d^{cy})/d^h$$
$$\hat{g}_j = \log(\hat{g}_j^w/d^w)$$
$$\hat{g}_j = \log(\hat{g}_j^h/d^h)$$

Similarly, $L_{conf}$(x, c) can be calculated using the equation:

$$L_{conf}(x, c) = -\sum_{i \in Pos}^{N} x_{ij}^p \log(\hat{c}_i^p) - \sum_{i \in Neg} \log(\hat{c}_i^0) \text{ where} \quad \text{Eq. 4}$$
$$\hat{c}_i^p = \frac{\exp(c_i^p)}{\sum_p \exp(c_i^p)}$$

The contrastive loss is the loss of the corresponding default bounding boxes between two adjacent frames, and can be calculated using the equation:

$$L_{contra}(d_{f-1}, d_f) = \sum_{n=1}^{\theta MN} (YD^2 + (1 - Y)\max(\text{threshold} - D, 0)^2) \quad \text{Eq. 5}$$

where D=$\|d_{f-1} - d_f\|_2$, which is the Euclidean distance of default bounding boxes between two adjacent frames, Y is the label whether two boxes are paired or not, threshold is the threshold of two boxes which are unpaired, and θ is the proportion of paired boxes and unpaired boxes. The weight terms α and β can be used to perform cross validation. An example training method that can be performed by the system 100 is described in greater detail with respect to FIG. 3 below.

The diagram of FIG. 1 is not intended to indicate that the example system 100 is to include all of the components shown in FIG. 1. Rather, the example system 100 can be implemented using fewer or additional components not illustrated in FIG. 1 (e.g., additional frames, still image object detectors, similarity detectors, loss calculators, etc.).

Figure 2:
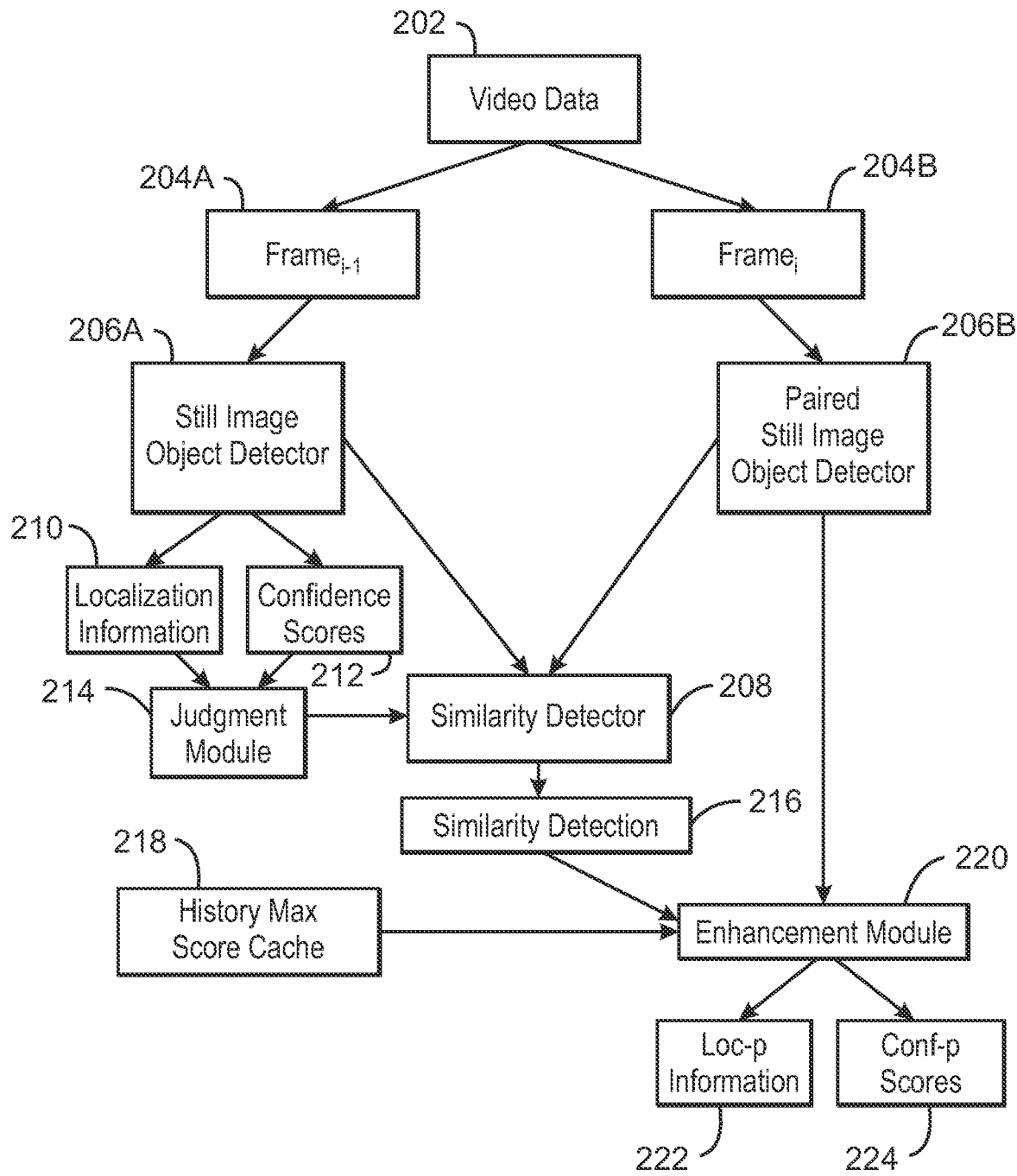
FIG. 2 is a flow chart illustrating an example system for detecting objects in video frames.

FIG. 2 is a block diagram illustrating an example system for detecting objects in video frames. The example system is referred to generally by the reference number 200 and can be implemented in the computing device 600 below in FIG. 6 using the method 400 of FIG. 4 below.

The example system 200 includes video data 202. For example, the video data may be a video stream of frames received from an imaging device (not shown). The system 200 includes a pair of frames 204A, 204B from the video data 202. For example, the frames 204A and 204B may be consecutive frames from a video stream. The system 200 further includes a pair of still image object detectors including a still image object detector 206A and a paired still image object detector 206B, shown receiving frame$_{i-1}$ 204A and frame$_i$ 204B, respectively. For example, the still image object detector 206A and paired still image object detector 206B may be region proposal network (faster R-CNN) detectors, region-based fully convolutional network (R-FCN) detectors, single-shot multibox (SSD) detectors, or you only look once (YOLO) detectors. The still image object detector 206A and paired still image object detector 206B may be the still image object detector 106A and the still image object detector 106B of FIG. 1 after the training described in further detail with respect to FIG. 3 below. The system 200 also includes a similarity detector 208 that is communicatively coupled to the still image object detector 206A and paired still image object detector 206B. For example, the similarity detector 208 may be a Siamese-CNN. The similarity detector may be the similarity detector 108 of FIG. 1 above, also trained using the method described in FIG. 1 above and FIG. 3 below. The system 200 includes localization information 210 and confidence scores 212 shown being generated by the still image object detector 206A. The system 200 also further includes a similarity detection 216 shown being generated by the similarity detector 208. The system 200 further includes a history max score cache 218 communicatively coupled to an enhancement module 220. The enhancement module 220 is further communicatively coupled to the similarity detector 208 to receive the similarity detection 216. The enhancement module 220 is shown generating an enhanced paired localization information (loc-p) 222 and paired confidence scores (conf-p) 224.

As shown in FIG. 2, a pair of adjacent frames 204A and 204B may be recited from a video data 202. For example, the video data 202 may be a video stream. Frame 204A may be input into the still image object detector 206A and the subsequent adjacent frame 204B may be input into the paired still image object detector 206B. The still image object detector 206A calculates localization information 210 and one or more confidence scores 212 for each potential object patch in the first frame. For example, the localization information 210 may include predicted bounding box coordinates ($x_{min}$, $y_{min}$) and ($x_{max}$, $y_{max}$). The confidence scores 212 may indicate a level of confidence that a default bounding box is associated with one or more particular object categories. For example, the default bounding box may be a default prior bounding box or a default proposed bounding box. In some examples, the confidence scores 212 may be any number of confidence scores associated with a number of possible object types or classifications. For example, given the possible classifications of "cat," "dog," "car," and "background," the confidence information may be: (cat_score, dog_score, . . . , car_score, background_score), where cat_score, dog_score, car_score, and background_score are confidence scores for each of the possible classifications.

The paired still image object detector 206B can similarly calculate localization information and confidence scores for each potential object patch in the second frame, referred to herein as paired localization information and paired confidence scores, respectively. In some examples, the judgment module 214 can perform a local search pairing to generate the potential object patches in the second frame in response to not detecting any potential object patch for the object in the second frame. For each of a plurality of detected default bounding boxes with higher confidence scores, the judgment module 214 can detect a plurality of potentially associated object patches in the second frame using local search pairing. The similarity detector 208 can detect paired objects in the adjacent frames based on a detected similarity between the paired objects. For example, the similarity detector 208 may be trained using a contrastive loss based on Euclidean distance as described above to compare default bounding boxes corresponding to paired patches to determine their similarity. In some examples, if two paired bounding boxes demonstrate similarity above a predetermined threshold, then a similarity detection 216 may be generated. For example, the predetermined threshold may be 0.5. The enhancement module 220 can modify the prediction result from the first still image object detector based on a comparison with the history max score cache. For example, if the history max score cache includes a prediction result with a greater confidence value for a given patch, then the prediction result may be changed to the prediction result in the history max score cache. The enhancement module 220 can generate an enhanced confidence score for each detected paired patch in the second frame based on the paired localization information and the paired confidence scores from the second trained still image object detector and a comparison with the confidence score of associated patches from the first trained still image object detector. For example, the enhancement module 220 can compare the paired confidence scores from the second trained still image object detector with a maximum confidence score in the history max score cache 218 and select a higher value from the comparison as the enhanced confidence score for the paired object in the second frame. The history max score cache 218 can store the enhanced confidence score and localization information for each patch in the second frame. Thus, the generated paired localization information loc-p 222 may correspond to a bounding box having an enhanced confidence score 224. An example method that can be performed by the system 200 is described in greater detail with respect to FIG. 4 below.

In some examples, the enhanced confidence score can be used to detect objects in a variety of applications. For example, the detected objects can be used for many high-level visual processing and analysis tasks, such as behavior analysis, criminal investigation, event detection, scene semantic understanding, video summary, video recommendation, person re-identification, among other possible applications.

The diagram of FIG. 2 is not intended to indicate that the example system 200 is to include all of the components shown in FIG. 2. Rather, the example system 200 can be implemented using fewer or additional components not illustrated in FIG. 2 (e.g., additional frames, still image object detectors, similarity detectors, caches, etc.).

Figure 3:
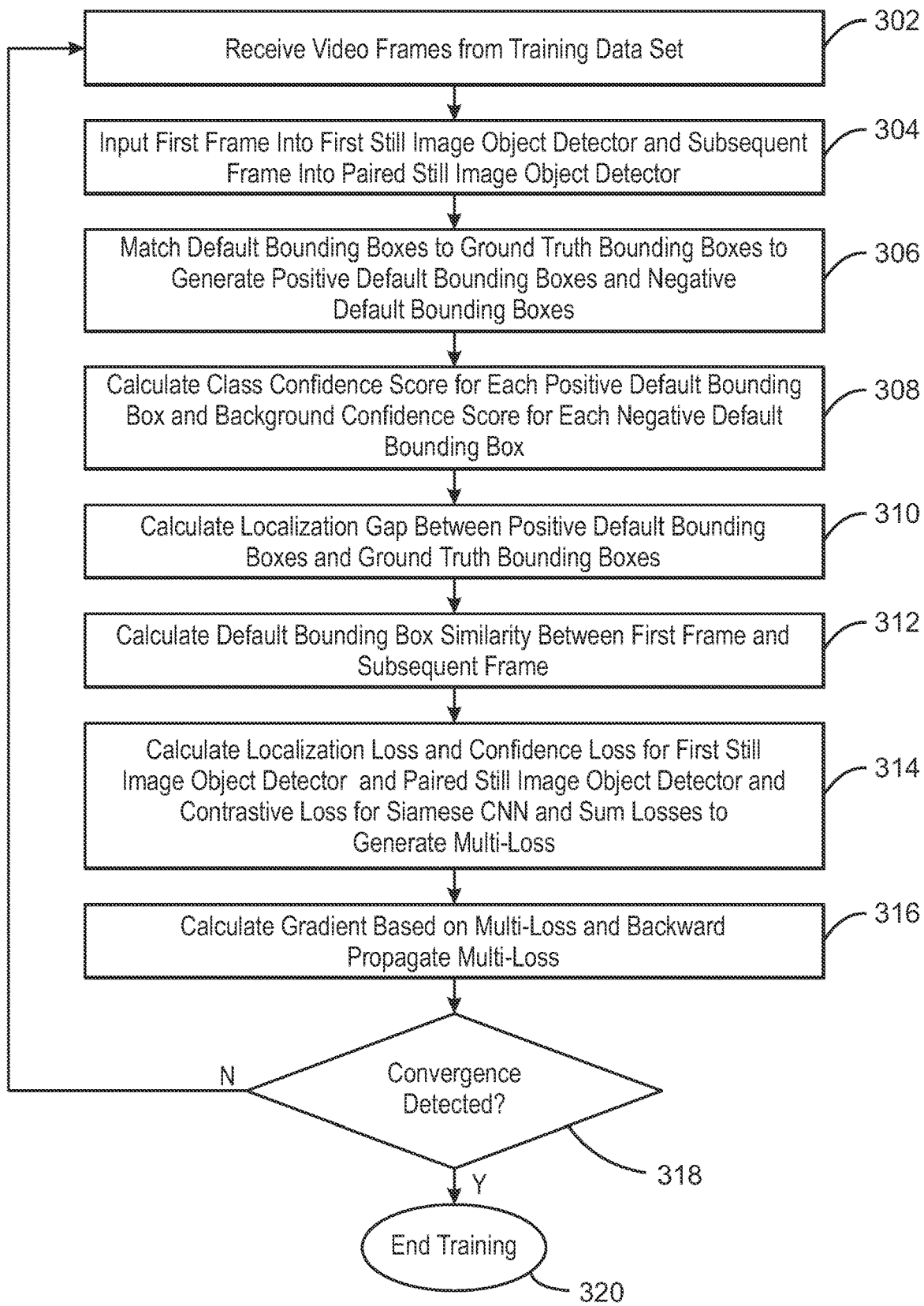
FIG. 3 is a flow chart illustrating an example method for training a neural network to detect objects in video frames.

FIG. 3 is a flow chart illustrating a method for training a neural network to detect objects in video frames. The example method is generally referred to by the reference number 300 and can be implemented in the system 100 of FIG. 1 above, the processor 602 of the computing device 600 of FIG. 6 below, or the computer readable media 700 of FIG. 7 below.

At block 302, a processor receives video frames from a training data set. For example, the video frames may include various objects.

At block 304, the processor inputs a first frame of the video frames into a first still image object detector and a subsequent frame into a paired still image object detector. For example, the still image object detectors may be a pair of SSD sub-networks.

At block 306, a pair of still image object detectors matches default bounding boxes to ground truth bounding boxes to generate positive default bounding boxes and negative default bounding boxes. For example, the still image object detectors can match default bounding boxes to ground truth bounding boxes, and then determine which default bounding boxes are positive and which default bounding boxes are negative.

At block 308, the pair of still image object detectors calculate a class confidence score for each positive default bounding box and a background confidence score for each negative default bounding box. For example, a pair of SSDs can calculate each object class confidence score based on each of the positive default bounding boxes and calculate each background confidence score based on each of the negative default bounding boxes.

At block 310, the still image object detectors calculate a localization gap between the positive default bounding boxes and the ground truth bounding boxes. For example, both of a pair of SSD sub-networks can calculate the localization gap between positive default bounding boxes and ground truth bounding boxes, but ignore negative default bounding boxes during calculation.

At block 312, a similarity detector calculates a default bounding box similarity between the first frame and a subsequent frame. For example, a Siamese-CNN can utilize lower features learned by SSD/SSD-p sub-networks and a default bounding box selection policy to calculate the default bounding boxes similarity between two frames.

At block 314, the processor calculates a localization loss and a confidence loss for a first still image object detector and a paired still image object detector and a contrastive loss for a similarity detector and sums the losses to generate a multi-loss. For example, the processor can calculate loc loss, conf loss, loc-p loss, conf-p loss and contrastive loss using label information from dataset, the output of still image object detectors and the similarity detector. The processor can then sum the five losses together to generate the multi-loss.

At block 316, the processor calculates a gradient based on the multi-loss and backward propagates the multi-loss. For example, the gradient may be calculated using partial derivatives with respect to each of the parameters of the multi-loss function. In some examples, the multi-loss can be propagated backwards through the entire training network, including the similarity detector and the pair of still image object detectors.

At decision diamond 318, the processor determines whether a convergence is detected. If convergence is detected, then the method may end at circle 320. If convergence is not detected, then the method may continue at block 302. For example, the frame number i may be incremented by one and the method may be repeated using the next two sequential frames until convergence is detected.

At block 320, the training ends. For example, the trained similarity detector and pair of still image object detectors can then be used in a validation network to detect objects in received video frames.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
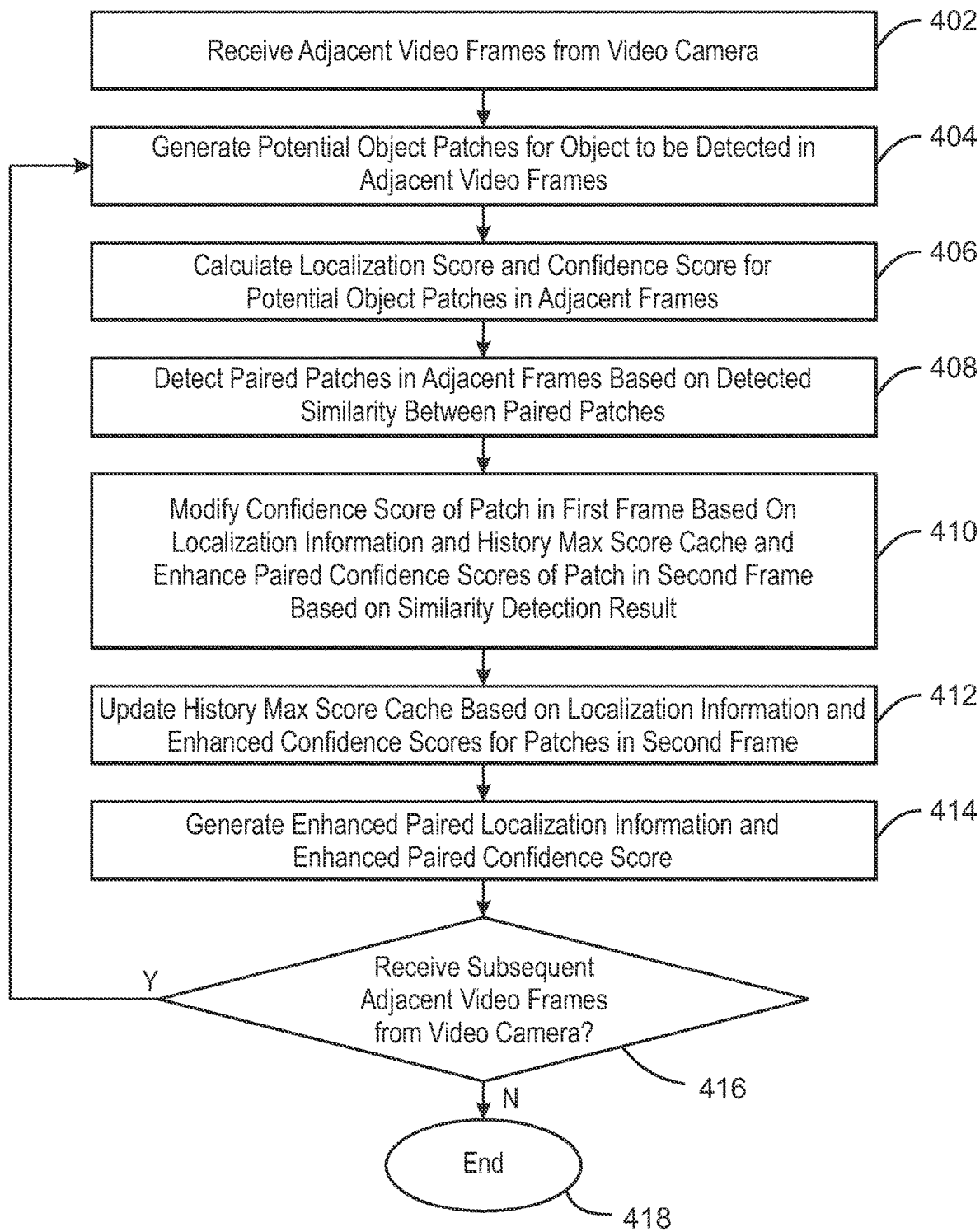
FIG. 4 is a flow chart illustrating a method for detecting objects in video frames.

FIG. 4 is a flow chart illustrating a method for detecting objects in video frames. The example method is generally referred to by the reference number 400 and can be implemented in the system 200 of FIG. 2 above, the validation network of the computer device 600 of FIG. 6 below, or the computer readable media 800 of FIG. 8 below.

At block 402, a processor receives adjacent video frames from a video camera. For example, a second video frame of the adjacent video frames may include occlusion, video defocus, motion blur, or a different pose for an object in the first frame.

At block 404, the still image object detectors generate potential object patches for an object to be detected in the adjacent video frames. For example, the still image object detectors can perform a patch proposal to generate patches, also referred to as candidate bounding boxes. In some examples, the method prior proposal or a posterior proposal may be used for performing patch proposal. The method used for patch proposal may be based on the type of still image object detector used, including SSD, YOLO, Faster R-CNN, or R-FCN, among other possible still image object detectors. For example, the prior proposal method may be used with one-stage object detectors, such as SSD and YOLO detectors. The prior proposal method may include generating a fixed number and position of patches for all the samples. As one example for SSDs, there can be 8,732 patch proposals generated for each sample frame which may cover different areas, different aspect ratios, and different scale sizes. The posterior proposal method may be used with two-stage object detector, such as the RFCN detector. The posterior proposal method may generate new patches for each sample first, and then perform confidence prediction based on new patches and similarity detection based on new paired patches. For example, a selective search algorithm can be utilized to perform patch proposal for a two-stage object detector. The selective search algorithm may generate object localization hypotheses by picture content at first. The hypotheses may generate many posterior proposal patches. The posterior proposal patches can later be utilized to perform localization prediction and confidence prediction.

In some examples, the patches for the second frame can be generated using local search pairing. For example, the paired still object detector can generate the potential object patches in the second frame in response to not detecting any potential object patch for the object in the second frame At block 406, the still image object detectors calculate a localization information and a confidence score for patches in the adjacent frames. For example, one of a pair of still image object detectors can predict localization and confidence info for all the potential object patches in the first frame. Alternatively, the first still image object detector can get cached information from a calculation made by the second still image object detector for the same frame in a previous iteration. The paired still image object detector can predict localization and confidence information for all the potential objects in the second frame. In some examples, a judgment generator can filter the detected potential object patches to be compared by the similarity detector based on the localization information and the confidence score from the first still image object detector.

Figure 5:
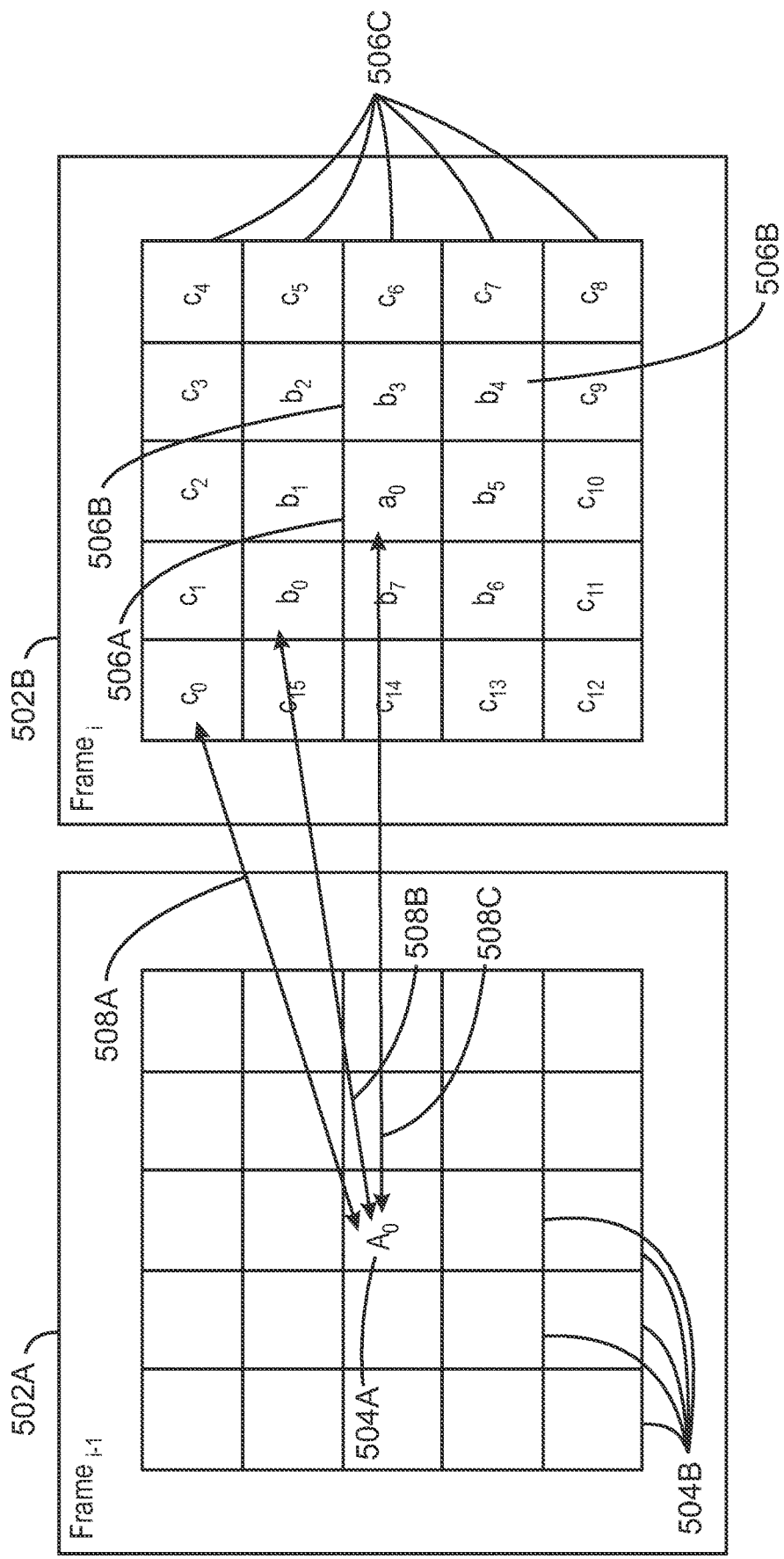
FIG. 5 is an diagram of an example local searching pairing being performed on an example pair of adjacent frames.

At block 408, a similarity detector detects paired patches in the adjacent frames based on a detected similarity between the paired patches. For example, a judgment generator can determine all the default bounding boxes that successfully infer a higher confidence score for confidence info in the first frame of the adjacent frames to generate a first paired box. The judgment generator can then generate a second paired box, where first paired box and the second paired box have a relationship. For example, one default bounding box $A_0$ in the first frame may pair with 9 (8+1), 25 (16+8+1) or more default bounding boxes in the second frame, as shown in the example of FIG. 5 below. Thus, for each of a plurality of detected default bounding boxes with higher confidence scores, the judgment generator can detect a plurality of associated potential object patches in the second frame using local search pairing. The similarity detector can then compare each $(A_0, a_0)$, $(A_0, b_0)$, $(A_0, b_1)$, ..., $(A_0, b_7)$, $(A_0, c_0)$, $(A_0, c_1)$, ..., $(A_0, c_{15})$ pair to track the similar patch $A_0$ in the first frame. For example, the similar patches may include the same object, but the appearance of the object may differ due to motion blur, partial occlusion, being in a different pose, etc.

At block 410, an enhancer modifies a confidence score for the first frame based on localization information and a history max score cache. Thus, the enhancer can check the history max score cache 218 using the localization information to verify that the confidence score for the first frame is inherited from a historical best detection result. For example, an index for a patch in the first frame may be 8721 and the patch may have a confidence score from the still image object detector of 0.45 for a cat category (8721, 0.45, cat). If the history max score cache includes a confidence score for the patch index 8721 of 0.78 for the dog category (8721, 0.78, dog), then the confidence score can be modified from (8721, 0.45, cat) to (8721, 0.78, dog). The enhancer can then enhance one or more paired confidence (conf-p) scores from the second frame based on the similarity detection result. In some examples, the enhancer can enhance the prediction result from the paired still image object detector by using the similarity detection and comparing the paired confidence score with the confidence score of the corresponding modified confidence score of the paired patch in the first frame. For example, the enhancer can generate an enhanced confidence score for each detected paired object in the second frame based on the higher confidence score from the second still image object detector and the modified confidence score from the first still image object detector. In some examples, the enhancer can compare the confidence score from the second trained still image object detector with the modified confidence score for a paired patch from the first trained still image object detector and select a higher value as the enhanced confidence score for the paired object in the second frame. In particular, the enhancer can replace the original paired confidence score from the paired still image object detector with a confidence score of a related patch in the first frame that is higher. For example, the similarity detection result from the similarity detector may indicate that a patch of index 8721 in the first frame is paired with a patch of index 6618 in the second frame. The paired still image object detector detection result for patch 6618 may be (6618, 0.39, cat). Thus, the confidence score of 0.78 (8721, 0.78, dog) is compared with the paired confidence score of 0.39 (6618, 0.39, cat). Because 0.78 is higher than 0.39, the former (dog) wins, and the enhancer can accordingly enhance the paired detection result from (6618, 0.39, cat) to (6618, 0.78, dog). In this example, 6618 is the default bounding box localization index. For example, for an SSD still image object detector, there may be a total of 8732 default bounding box localization indices. In this example, the indices may be arranged as follows: Index1→(index1_x_min, index1_y_min, index1_x_max, index1_y_max), Index2→(index2_x_min, index2_y_min, index2_x_max, index2_y_max), ..., Index6618→(index6618_x_min, index6618_y_min, index6618_x_max, index6618_y_max), ..., Index8732→(index8732_x_min, index8732_y_min, index8732_x_max, index8732_y_max). The localization training target for the default bounding box localization index 6618 may be to generate localization information based on the 6618 default bounding box. The final localization information for index 6618 may be (index6618_x_min+delta_x_min, index6618_y_min+delta_y_min, index6618_x_max+delta_x_max, index6618_y_max+delta_y_max), where delta_x_min, delta_y_min, delta_x_max, delta_y_max are learned after the training phase.

At block 412, the processor updates the history max score cache based on the localization information and the enhanced confidence scores for the paired patches in the second frame. For example, the processor can update the history max score cache to include the localization information and the enhanced paired confidence score associated with the paired patch. The history max score cache can then be used by the processor to modify prediction results of a first still image object detector in the next iteration.

At block 414, the processor generates an enhanced paired localization information and an enhanced paired confidence score. In some examples, the enhanced paired confidence score may result in the recognition result changing from "unknown" to the object, such as a dog, a person, or any other object to be detected in the second frame. In some examples, the processor may change the recognition result from one object to another object based on the enhanced paired confidence score as described above.

At decision diamond 416, the processor determines whether subsequent adjacent video frames have been received from the video camera. If no subsequent adjacent video frames have been received from the video camera, then the method may end at oval 418. If subsequent at least one adjacent video frame has been received from the video camera, then the method 400 may proceed back to block 404 to process the at least one additional adjacent video frame.

At oval 418, the method ends. For example, if no additional adjacent frames are received, then the method may end.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation. For example, the first still image object detector can use the enhanced confidence score and associated localization information for a potential object patch in a subsequent iteration.

FIG. 5 is a diagram of an example local searching pairing being performed on an example pair of adjacent frames. The example pair of adjacent frames is referred to generally by the reference number 500 and the local search pairing may be performed using the computing device 600 below in FIG. 6 using the method 400 of FIG. 4 above.

The example of FIG. 5 includes a first frame 502A and a second paired frame 502B. For example, the second paired frame 502B may be an adjacent frame captured and received subsequently and consecutively to frame 502A. The first frame 502A includes a default bounding box 504A. The first frame 502A also includes a set of additional default bounding boxes 504B. The second frame 502B includes a first default bounding box 506A in the same position as the default bounding box 504A of the first frame 502A. The second frame 502B also includes a second set of default bounding boxes 506B that border the bounding box 506A. The second frame 502B further includes a third set of default bounding boxes 506C that border the second set of default bounding boxes 506B. Three arrows 508A, 508B, and 508C indicate a pairing of the default bounding box 504 of the first frame 502A with the first default bounding box 506A, the second set of default bounding boxes 506B, and the third set of default bounding boxes 506C.

As shown in FIG. 5, a judgment module can cause a processor to determine all the default bounding boxes that infer the highest confidence score for confidence information in the first frame 502A. The resulting default bounding boxes 504A and 504B may form a first paired box. The judgment module can also determine a second paired box of default bounding boxes including default bounding boxes 506A, 506B, and 506C. In the example of FIG. 5, the default bounding box 504A can be paired with 9 or more default bounding boxes as shown by the arrows. For example, the default bounding box 504A can be paired with 9 bounding boxes in the second frame 502B including the default bounding box 506A and the second set of default bounding boxes 506B. In some examples, the default bounding box 504A can be paired with 25 bounding boxes in the second frame 502B including the default bounding box 506A, the second set of default bounding boxes 506B, and the third set of default bounding boxes 506C. The resulting pairs may include (A0, a0), (A0, b0), (A0, b1), ..., (A0, b7), (A0, c0), (A0, c1), ..., (A0, c15). The sets of pairs can be used by a Siamese-CNN to compare and track the same object patch in the second frame 502B, as described in greater detail above.

The diagram of FIG. 5 is not intended to indicate that the example system 500 is to include all of the components shown in FIG. 5. Rather, the example system 500 can be implemented using fewer or additional components not illustrated in FIG. 5 (e.g., additional frames, paired boxes, default bounding boxes, etc.).

Figure 6:
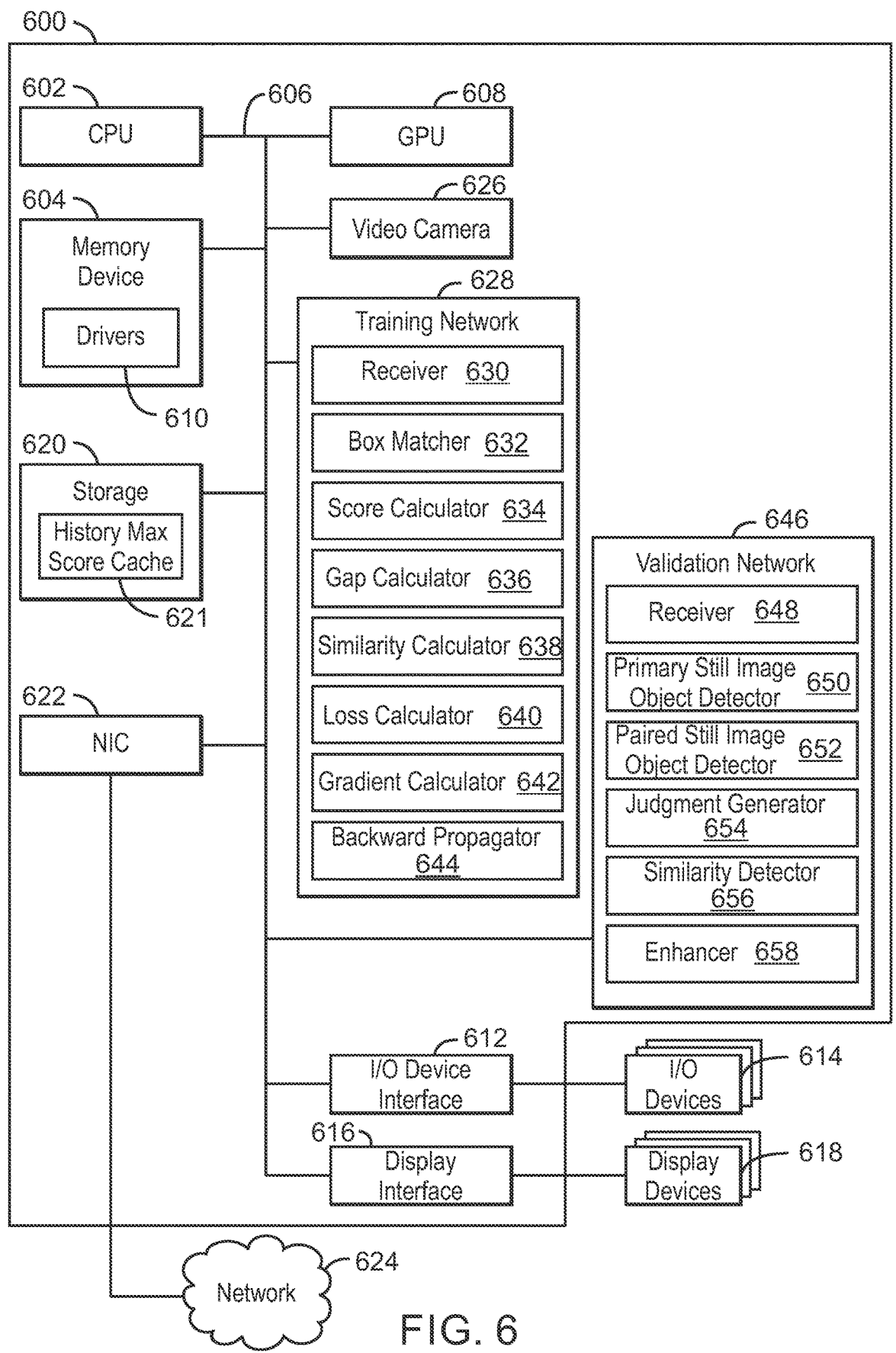
FIG. 6 is block diagram illustrating an example computing device that can detect objects in video frames.

Referring now to FIG. 6, a block diagram is shown illustrating an example computing device that can detect objects in video frames. The computing device 600 may be, for example, a laptop computer, desktop computer, tablet computer, mobile device, or wearable device, among others. In some examples, the computing device 600 may be a security camera, a robotic computing device, an augmented reality device, a virtual reality device, or a data center server device. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for detecting objects in video frames using similarity. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The storage device 620 includes a history max score cache 621. For example, the history max score cache 621 can store maximum values for confidence scores of paired patches. For example, the stored values may be enhanced confidence scores for patches as described in greater detail below.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a video camera 626. For example, the video camera may include one or more imaging sensors. In some example, the video camera may include a processor to generate a series of adjacent frames.

The computing device 600 further includes a training network 628. For example, the training network 628 can be used to train validation networks to detect objects using similarity. The training network 628 can include a receiver 630, a box matcher 632, a score calculator 634, a gap calculator 636, a similarity calculator 638, a loss calculator 640, a gradient calculator 642, and a backward propagator 644. In some examples, each of the components 630-644 of the training network 628 may be a microcontroller, embedded processor, or software module. The receiver 630 can receive video frames from a video camera. In some examples, the video camera may be video camera 626. The box matcher 632 can match default bounding boxes to ground truth bounding boxes to generate positive default bounding boxes and negative default bounding boxes. For example, the box matcher 632 can match default bounding boxes to ground truth bounding boxes, and then determine which default bounding boxes are positive and which default bounding boxes are negative. The score calculator 634 can calculate a class confidence score for each positive default bounding box and a background confidence score for each negative default bounding box. For example, the score calculator 634 can calculate each object class confidence score based on each of the positive default bounding boxes and calculate each background confidence score based on each of the negative default bounding boxes. The gap calculator 636 can calculate a localization gap between the positive default bounding boxes and the ground truth bounding boxes. In some examples, the gap calculator 636 can calculate the localization gap between positive default bounding boxes and ground truth bounding boxes, but ignore negative default bounding boxes calculation. The similarity calculator 638 can calculate a default bounding box similarity between the first frame and a subsequent frame. For example, the similarity calculator 638 can utilize lower features learned by still image object detector sub-networks and a default bounding box selection policy to calculate the default bounding boxes similarity between two frames. The loss calculator 640 can calculate a localization loss and a confidence loss for a first still image object detector and a paired still image object detector and a contrastive loss for a similarity detector and sums the losses to generate a multi-loss. For example, the loss calculator 640 can calculate localization loss, confidence loss, paired localization loss, paired confidence loss, and contrastive loss using label information from dataset, the output of a pair of still image object detector sub-networks and a similarity detector. The gradient calculator 642 can calculate a gradient based on the multi-loss. The backward propagator 644 can backward propagate the multi-loss. For example, the backward propagator 644 can backward propagate the multi-loss through the entire training network, including the similarity detector and pair of still image object detectors.

The computing device 600 further includes a validation network 646. For example, the validation network 646 can be used to detect objects using similarity. The validation network 646 can include a receiver 648, a primary still image object detector 650, a paired still image object detector 652, a judgment generator 654, a similarity detector 656, and an enhancer 658. In some examples, each of the components 648-658 of the validation network 646 may be a microcontroller, embedded processor, or software module. In some examples, the primary still image object detector 650 and the paired still image object detector 652 can be convolutional neural networks. For example, the primary still image object detector 650 and the paired still image object detector 652 can be region proposal network (faster R-CNN) detectors, region-based fully convolutional network (R-FCN) detectors, single-shot multibox (SSD) detectors, or you only look once (YOLO) detectors. The receiver 648 can receive a plurality of video frames from a video camera. For example, the receiver may receive at least two adjacent frames from the video camera 626. In some examples, at least one of the frames may have an object to be detected that is partially occluded, affected by video defocus or motion blur, or in a rare pose.

The primary still image object detector 650 can receive a first frame of the plurality of video frames and calculate localization information and confidence information for each potential object patch in the first frame. The paired still image object detector 652 can receive an adjacent frame of the plurality of video frames adjacent to the first frame and calculate localization information and confidence information for each potential object patch in the adjacent frame.

The paired still image object detector 652 can generate a plurality of potential object patches based on a potential object patch in the first frame in response to not detecting any potential object patch for the object in the adjacent frame. The judgment generator 654 can perform a local search pairing to generate the potential object patches in the adjacent frame in response to not detecting any potential object patch for the object in the adjacent frame. In some examples, the judgment generator 654 can detect a plurality of associated potential object patches in the adjacent frame using local search pairing for each of a plurality of detected default bounding boxes with higher confidence scores.

The similarity detector 656 can detect paired objects between the first frame and the adjacent frame based on a comparison of the detected potential object patches. In some examples, the similarity detector 656 can detect the paired patch in the adjacent frame based on a color of the object. In some examples, the similarity detector 656 can detect the paired patch in the adjacent frame based on a shape of the object.

The enhancer 658 can updated a confidence score for the paired patch in the first frame based on localization and a history max score cache. For example, the enhancer 658 can check the history max score cache using the localization information to verify that the confidence score for the first frame is inherited from a historical best detection result in the max score history cache. The enhancer 658 can modify a prediction result for a paired patch in the adjacent frame to a prediction result of a corresponding paired patch in the first frame with a higher confidence score than the prediction result of the paired patch in the adjacent frame. For example, the enhancer 658 can iteratively modify a prediction result in one or more paired patches of one or more frames adjacent to the adjacent frame to a prediction result corresponding to a paired patch in a previous frame. The enhancer 658 can generate an enhanced confidence score for each detected paired patch in the adjacent frame based on a comparison of the confidence score from the second trained still image object detector and the confidence score of a paired patch in the first frame. For example, the enhancer 658 can compare the confidence score from the second trained still image object detector with the confidence score of the patch in the first frame and select a higher value as the enhanced confidence score for the paired object in the adjacent frame. In some examples, the enhancer 658 can cache the localization information and enhanced confidence information for each patch in the adjacent frame in a history max score cache for use by the primary still image object detector 650 in subsequent frame.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the training network 628 or the validation network 646, including the receiver 630, the box matcher 632, the score calculator 634, the gap calculator 636, the similarity calculator 638, the loss calculator 640, and the gradient calculator 642, the backward propagator 644, the receiver 648, the primary still image object detector 650, the paired still image object detector 652, the judgment generator 654, the similarity detector 656, and the enhancer 658, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the training network 628 or the validation network 646 may be implemented with an application specific integrated circuit, in logic implemented in a processor, in logic implemented in a specialized graphics processing unit such as the GPU 608, or in any other device.

Figure 7:
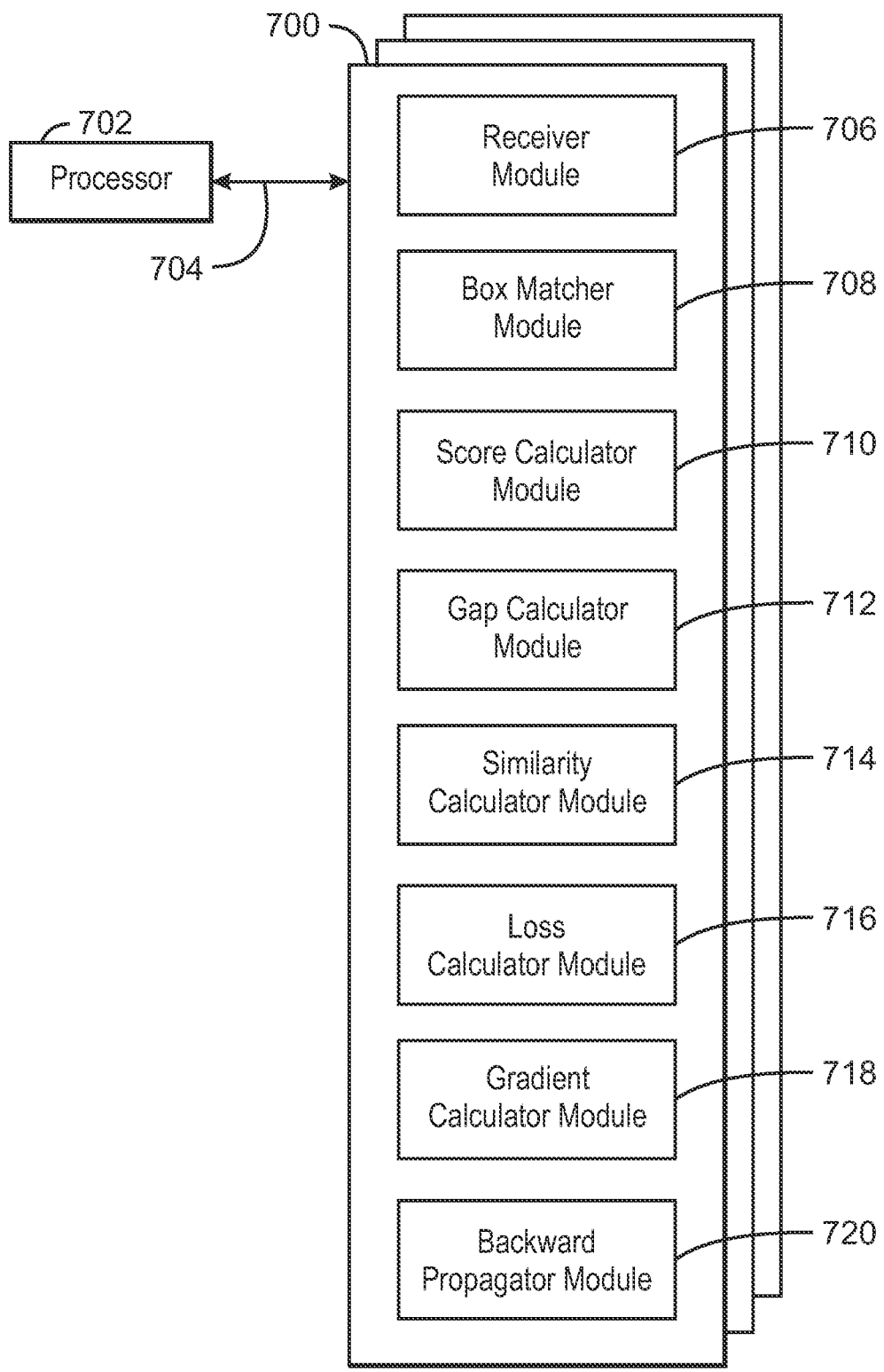
FIG. 7 is a block diagram showing computer readable media that store code for training a neural network to detect objects in video frames.

FIG. 7 is a block diagram showing computer readable media 700 that store code for training a neural network to detect objects in video frames. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a receiver module 706 may be configured to receive video frames from a video camera. A box matcher module 708 may be configured to match default bounding boxes to ground truth bounding boxes to generate positive default bounding boxes and negative default bounding boxes. In some examples, the box matcher module 708 may be configured to match default bounding boxes to ground truth bounding boxes, and then determine which default bounding boxes are positive and which default bounding boxes are negative. A score calculator module 710 may be configured to calculate a class confidence score for each positive default bounding box and a background confidence score for each negative default bounding box. For example, the score calculator module 710 may be configured to calculate each object class confidence score based on each of the positive default bounding boxes and calculate each background confidence score based on each of the negative default bounding boxes. A gap calculator module 712 may be configured to calculate a localization gap between the positive default bounding boxes and the ground truth bounding boxes. For example, the gap calculator module 712 may be configured to calculate the localization gap between positive default bounding boxes and ground truth bounding boxes, but ignore negative default bounding boxes calculation. A similarity calculator module 714 may be configured to calculate a default bounding box similarity between the first frame and a subsequent frame. For example, the similarity calculator module 714 may be configured to utilize lower features learned by still image object detector subnetworks and a default bounding box selection policy to calculate the default bounding boxes similarity between two frames. A loss calculator module 716 may be configured to calculate a localization loss and a confidence loss for a first still image object detector and a paired still image object detector and a contrastive loss for a similarity detector and sum the losses to generate a multi-loss. For example, the loss calculator module 716 may be configured to calculate localization loss, confidence loss, paired localization loss, paired confidence loss, and contrastive loss using label information from dataset, the output of still image object detector subnetworks and the similarity detector. The loss calculator module 716 may be configured to then sum the five losses together to generate the multi-loss. A gradient calculator module 718 may be configured to calculate a gradient based on the multi-loss. A backward propagator module 720 may be configured to backward propagate the multi-loss. For example, the gradient calculator module 718 may be configured to backward propagate the multi-loss through the entire training network, including the similarity detector and a pair of still image object detectors.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

Figure 8:
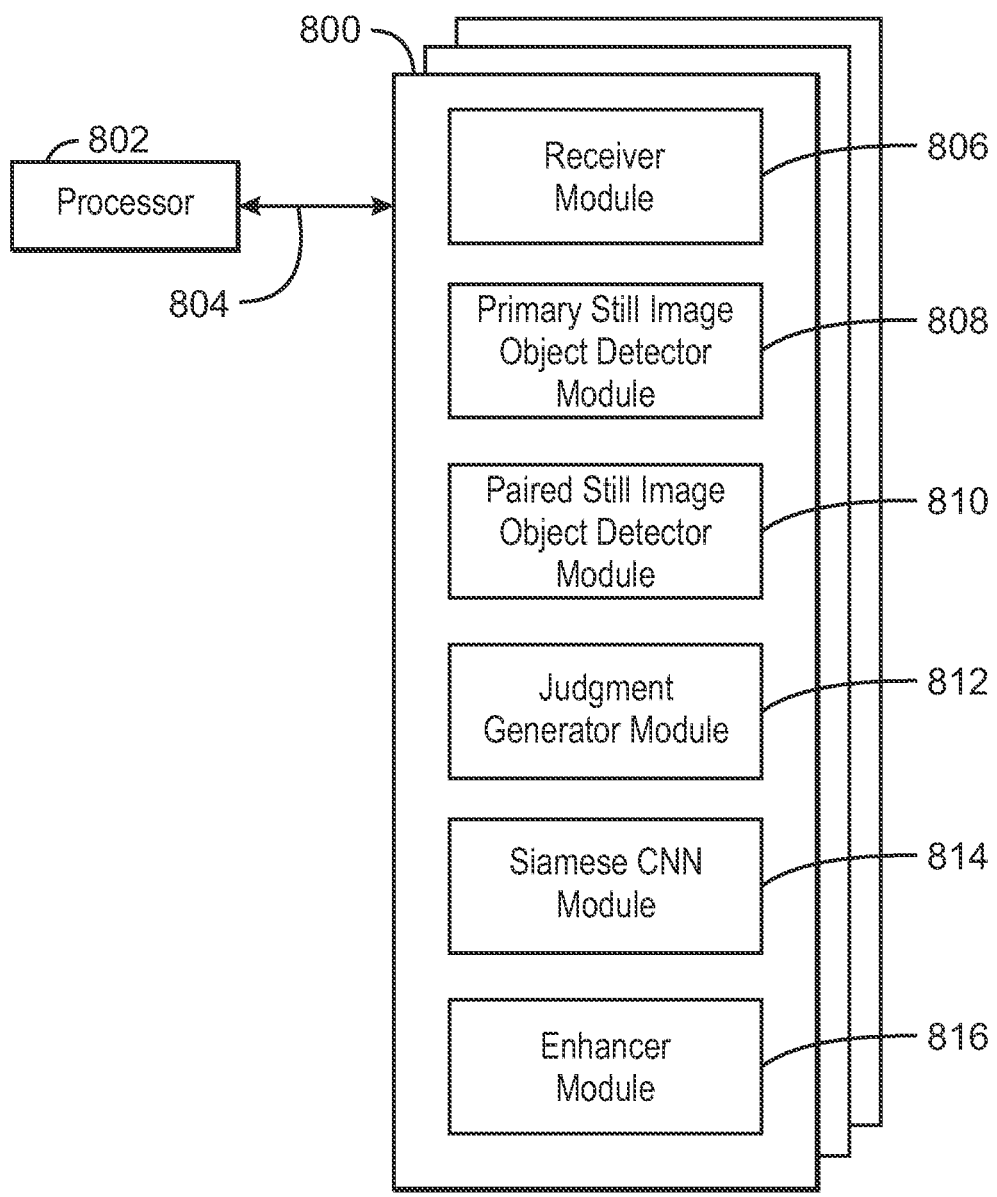
FIG. 8 is a block diagram showing computer readable media that store code for detecting objects in video frames.

FIG. 8 is a block diagram showing computer readable media 800 that store code for detecting objects in video frames. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a receiver module 806 may be configured to receive a pair of adjacent video frames from a video camera. A primary still image object detector module 808 may be configured to calculate a localization information and confidence score for each potential object patch in a first frame of the pair of adjacent frames. A paired still image object detector module 810 may be configured to calculate a localization information and confidence score for each potential object patch in a second frame of the pair of adjacent frames. A judgment generator module 812 may be configured to perform a local search pairing to generate the potential object patches in the second frame in response to not detecting any potential object patch for the object in the second frame. For example, for each of a plurality of detected default bounding boxes with higher confidence scores, the judgment generator module 812 may be configured to detect a plurality of associated potential object patches in the second frame using local search pairing. In some examples, the judgment generator module 812 may be configured to filter the detected potential object patches to be compared by the similarity detector based on the localization information and the confidence score from the first still image object detector. In some examples, the judgment generator module 812 may be configured to detect default bounding boxes with higher confidence scores in the first frame to generate a paired box. A similarity detector module 814 may be configured to detect paired patches in the adjacent frames based on a detected similarity between the paired patches. An enhancer module 816 module may be configured to modify the confidence score of a paired patch in the first frame based on the localization information associated with the paired patch and a history max score cache. In some examples, the enhancer module 816 module may be configured to generate an enhanced confidence score for each detected paired object in the first frame based on the localization information and the confidence score from the second trained still image object detector and the history max score cache. The enhancer module 816 module may also be configured to compare the confidence score for a paired patch from the second trained still image object detector with a modified confidence score for a corresponding paired patch from the first trained still image object detector and select a higher value as the enhanced confidence score for the paired patch in the second frame. In some examples, the enhancer module 816 module may be configured to update the history max score cache to include the localization information and the enhanced confidence score associated with the paired object in the second frame.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation. For example, the primary still image object detector module 808 may be configured to use the enhanced confidence score and associated localization information for a potential object patch in subsequent iterations processing additional frames.

EXAMPLES

Example 1 is an apparatus for detecting objects in video frames. The apparatus includes a receiver to receive a plurality of video frames from a video camera. The apparatus also includes a first still image object detector to receive a first frame of the plurality of video frames and calculate localization information and confidence information for each potential object patch in the first frame. The apparatus further includes a second still image object detector to receive an adjacent frame of the plurality of video frames adjacent to the first frame and calculate localization information and confidence information for each potential object patch in the adjacent frame. The apparatus also further includes a similarity detector trained to detect paired patches between the first frame and the adjacent frame based on a comparison of the detected potential object patches. The apparatus also includes an enhancer to modify a prediction result for a paired patch in the adjacent frame to a prediction result of a corresponding paired patch in the first frame including a higher confidence score than the prediction result of the paired patch in the adjacent frame.

Example 2 includes the apparatus of example 1, including or excluding optional features. In this example, the second still image object detector is to generate a plurality of potential object patches based on a potential object patch in the first frame in response to not detecting any potential object patch for the object in the adjacent frame.

Example 3 includes the apparatus of any one of examples 1 to 2, including or excluding optional features. In this example, the enhancer is to iteratively modify a prediction result in one or more paired patches of one or more frames adjacent to the adjacent frame to a prediction result corresponding to a paired patch in a previous frame.

Example 4 includes the apparatus of any one of examples 1 to 3, including or excluding optional features. In this example, the similarity detector is to detect the paired patch in the adjacent frame based on a color of the object.

Example 5 includes the apparatus of any one of examples 1 to 4, including or excluding optional features. In this example, the similarity detector is to detect the paired patch in the adjacent frame based on a shape of the object.

Example 6 includes the apparatus of any one of examples 1 to 5, including or excluding optional features. In this example, the enhancer is to cache the localization information and the enhanced confidence information for each patch in the adjacent frame in a history max score cache for use by the first still image object detector in subsequent frames.

Example 7 includes the apparatus of any one of examples 1 to 6, including or excluding optional features. In this example, the adjacent frame includes an object with a motion blur, a video defocus, or a partial occlusion.

Example 8 includes the apparatus of any one of examples 1 to 7, including or excluding optional features. In this example, the first still image object detector and the second still image object detector include convolutional neural networks.

Example 9 includes the apparatus of any one of examples 1 to 8, including or excluding optional features. In this example, the first still image object detector and the second still image object detector include region proposal network (faster R-CNN) detectors, region-based fully convolutional network (R-FCN) detectors, single-shot multibox (SSD) detectors, or you only look once (YOLO) detectors.

Example 10 includes the apparatus of any one of examples 1 to 9, including or excluding optional features. In this example, the similarity detector includes a Siamese convolutional neural network.

Example 11 is a method for detecting objects in video frames. The method includes receiving, via a processor, a pair of adjacent video frames from a video camera. The method also includes calculating, via a first trained still image object detector and a second trained still image object detector, a localization information and confidence score for each potential object patch in a first frame and a second frame of the pair of adjacent frames. The method further includes detecting, via a trained similarity detector, paired patches in the adjacent frames based on a detected similarity between the paired patches. The method also further includes modifying, via the processor, the confidence score of a patch in the first frame based on the localization information and a history max score cache and enhancing a paired confidence score of a patch in the second frame based on a similarity detection result.

Example 12 includes the method of example 11, including or excluding optional features. In this example, the method includes performing a local search pairing to generate the potential object patches in the second frame in response to not detecting any potential object patch for the object in the second frame.

Example 13 includes the method of any one of examples 11 to 12, including or excluding optional features. In this example, the method includes filtering the detected potential object patches to be compared by the similarity detector based on the localization information and the confidence score from the first still image object detector.

Example 14 includes the method of any one of examples 11 to 13, including or excluding optional features. In this example, enhancing the paired confidence score includes generating an enhanced confidence score for each detected paired object in the second frame based on a comparison of the localization information and the confidence score from the second trained still image object detector and the modified confidence score of the patch in the first frame.

Example 15 includes the method of any one of examples 11 to 14, including or excluding optional features. In this example, modifying the confidence score includes comparing the confidence score from the first trained still image object detector with a maximum confidence score in the history max score cache and selecting a higher value as the modified confidence score for the paired patch in the first frame.

Example 16 includes the method of any one of examples 11 to 15, including or excluding optional features. In this example, the method includes training the first still image object detector, the second still image object detector, and the similarity detector based on a calculated multi-loss that is backward propagated.

Example 17 includes the method of any one of examples 11 to 16, including or excluding optional features. In this example, the method includes updating the history max score cache to include the localization information and the enhanced confidence score associated with the paired patch in the second frame.

Example 18 includes the method of any one of examples 11 to 17, including or excluding optional features. In this example, the enhancer is to use the enhanced confidence score and associated localization information stored in a history max score cache to modify prediction results of the first still image object detector in a subsequent iteration.

Example 19 includes the method of any one of examples 11 to 18, including or excluding optional features. In this example, detecting the paired objects includes detecting default bounding boxes including a higher confidence score in the first frame to generate a paired box.

Example 20 includes the method of any one of examples 11 to 19, including or excluding optional features. In this example, detecting the paired objects includes, for each of a plurality of detected default bounding boxes with higher confidence scores, detecting a plurality of associated potential object patches in the second frame using local search pairing.

Example 21 is at least one computer readable medium for detecting objects in video frames having instructions stored therein that. The computer-readable medium includes instructions that direct the processor to receive a pair of adjacent video frames from a video camera. The computer-readable medium also includes instructions that direct the processor to calculate a localization information and confidence score for each potential object patch in a first frame and a second frame of the pair of adjacent frames. The computer-readable medium further includes instructions that direct the processor to detect paired patches in the adjacent frames based on a detected similarity between the paired patches. The computer-readable medium also further includes instructions that direct the processor to modify the confidence score of a patch in the first frame based on the localization information and a history max score cache and enhancing a paired confidence score of a patch in the second frame based on a similarity detection result.

Example 22 includes the computer-readable medium of example 21, including or excluding optional features. In this example, the computer-readable medium includes instructions to perform a local search pairing to generate the potential object patches in the second frame in response to not detecting any potential object patch for the object in the second frame.

Example 23 includes the computer-readable medium of any one of examples 21 to 22, including or excluding optional features. In this example, the computer-readable medium includes instructions to filter the detected potential object patches to be compared by the similarity detector based on the localization information and the confidence score from the first still image object detector.

Example 24 includes the computer-readable medium of any one of examples 21 to 23, including or excluding optional features. In this example, the computer-readable medium includes instructions to generate an enhanced confidence score for each detected paired object in the second frame based on a comparison of the localization information and the confidence score from the second trained still image object detector and the modified confidence score of the patch in the first frame.

Example 25 includes the computer-readable medium of any one of examples 21 to 24, including or excluding optional features. In this example, the computer-readable medium includes instructions to compare the confidence score from the first trained still image object detector with a maximum confidence score in the history max score cache and select a higher value as the modified confidence score for the paired patch in the first frame.

Example 26 includes the computer-readable medium of any one of examples 21 to 25, including or excluding optional features. In this example, the computer-readable medium includes instructions to train the first still image object detector, the second still image object detector, and the similarity detector based on a calculated multi-loss that is backward propagated.

Example 27 includes the computer-readable medium of any one of examples 21 to 26, including or excluding optional features. In this example, the computer-readable medium includes instructions to update the history max score cache to include the localization information and the enhanced confidence score associated with the paired patch in the second frame.

Example 28 includes the computer-readable medium of any one of examples 21 to 27, including or excluding optional features. In this example, the computer-readable medium includes instructions to use the enhanced confidence score and associated localization information stored in a history max score cache to modify prediction results of the first still image object detector in a subsequent iteration.

Example 29 includes the computer-readable medium of any one of examples 21 to 28, including or excluding optional features. In this example, the computer-readable medium includes instructions to detect default bounding boxes including a higher confidence score in the first frame to generate a paired box.

Example 30 includes the computer-readable medium of any one of examples 21 to 29, including or excluding optional features. In this example, the computer-readable medium includes instructions to detect a plurality of associated potential object patches in the second frame using local search pairing for each of a plurality of detected default bounding boxes with higher confidence scores.

Example 31 is a system for detecting objects in video frames. The system includes a receiver to receive a plurality of video frames from a video camera. The system also includes a first still image object detector to receive a first frame of the plurality of video frames and calculate localization information and confidence information for each potential object patch in the first frame. The system further includes a second still image object detector to receive an adjacent frame of the plurality of video frames adjacent to the first frame and calculate localization information and confidence information for each potential object patch in the adjacent frame. The system also further includes a similarity detector trained to detect paired patches between the first frame and the adjacent frame based on a comparison of the detected potential object patches. The system also includes an enhancer to modify a prediction result for a paired patch in the adjacent frame to a prediction result of a corresponding paired patch in the first frame including a higher confidence score than the prediction result of the paired patch in the adjacent frame.

Example 32 includes the system of example 31, including or excluding optional features. In this example, the second still image object detector is to generate a plurality of potential object patches based on a potential object patch in the first frame in response to not detecting any potential object patch for the object in the adjacent frame.

Example 33 includes the system of any one of examples 31 to 32, including or excluding optional features. In this example, the enhancer is to iteratively modify a prediction result in one or more paired patches of one or more frames adjacent to the adjacent frame to a prediction result corresponding to a paired patch in a previous frame.

Example 34 includes the system of any one of examples 31 to 33, including or excluding optional features. In this example, the similarity detector is to detect the paired patch in the adjacent frame based on a color of the object.

Example 35 includes the system of any one of examples 31 to 34, including or excluding optional features. In this example, the similarity detector is to detect the paired patch in the adjacent frame based on a shape of the object.

Example 36 includes the system of any one of examples 31 to 35, including or excluding optional features. In this example, the enhancer is to cache the localization information and the enhanced confidence information for each patch in the adjacent frame in a history max score cache for use by the first still image object detector in subsequent frames.

Example 37 includes the system of any one of examples 31 to 36, including or excluding optional features. In this example, the adjacent frame includes an object with a motion blur, a video defocus, or a partial occlusion.

Example 38 includes the system of any one of examples 31 to 37, including or excluding optional features. In this example, the first still image object detector and the second still image object detector include convolutional neural networks.

Example 39 includes the system of any one of examples 31 to 38, including or excluding optional features. In this example, the first still image object detector and the second still image object detector include region proposal network (faster R-CNN) detectors, region-based fully convolutional network (R-FCN) detectors, single-shot multibox (SSD) detectors, or you only look once (YOLO) detectors.

Example 40 includes the system of any one of examples 31 to 39, including or excluding optional features. In this example, the similarity detector includes a Siamese convolutional neural network.

Example 41 is a system for detecting objects in video frames. The system includes means for receiving a plurality of video frames from a video camera. The system also includes means for receiving a first frame of the plurality of video frames and calculating localization information and confidence information for each potential object patch in the first frame. The system further includes means for receiving an adjacent frame of the plurality of video frames adjacent to the first frame and calculating localization information and confidence information for each potential object patch in the adjacent frame. The system also further includes means for detecting paired patches between the first frame and the adjacent frame based on a comparison of the detected potential object patches. The system also includes means for modifying a prediction result for a paired patch in the adjacent frame to a prediction result of a corresponding paired patch in the first frame including a higher confidence score than the prediction result of the paired patch in the adjacent frame.

Example 42 includes the system of example 41, including or excluding optional features. In this example, the means for calculating localization information and confidence information for each potential object patch in the adjacent frame is to generate a plurality of potential object patches based on a potential object patch in the first frame in response to not detecting any potential object patch for the object in the adjacent frame.

Example 43 includes the system of any one of examples 41 to 42, including or excluding optional features. In this example, the means for modifying the prediction result is to iteratively modify a prediction result in one or more paired patches of one or more frames adjacent to the adjacent frame to a prediction result corresponding to a paired patch in a previous frame.

Example 44 includes the system of any one of examples 41 to 43, including or excluding optional features. In this example, the means for detecting the paired patches is to detect the paired patch in the adjacent frame based on a color of the object.

Example 45 includes the system of any one of examples 41 to 44, including or excluding optional features. In this example, the means for detecting the paired patches is to detect the paired patch in the adjacent frame based on a shape of the object.

Example 46 includes the system of any one of examples 41 to 45, including or excluding optional features. In this example, the means for modifying the prediction result is to cache the localization information and the enhanced confidence information for each patch in the adjacent frame in a history max score cache for use by the means for calculating localization information and confidence information for each potential object patch in the first frame in subsequent frames.

Example 47 includes the system of any one of examples 41 to 46, including or excluding optional features. In this example, the adjacent frame includes an object with a motion blur, a video defocus, or a partial occlusion.

Example 48 includes the system of any one of examples 41 to 47, including or excluding optional features. In this example, the means for calculating localization information and confidence information for each potential object patch in the first frame and the means for calculating localization information and confidence information for each potential object patch in the adjacent frame include convolutional neural networks.

Example 49 includes the system of any one of examples 41 to 48, including or excluding optional features. In this example, the means for calculating localization information and confidence information for each potential object patch in the first frame and the means for calculating localization information and confidence information for each potential object patch in the adjacent frame include region proposal network (faster R-CNN) detectors, region-based fully convolutional network (R-FCN) detectors, single-shot multibox (SSD) detectors, or you only look once (YOLO) detectors.

Example 50 includes the system of any one of examples 41 to 49, including or excluding optional features. In this example, the means for detecting the paired patches includes a Siamese convolutional neural network.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for detecting objects in video frames, the apparatus comprising:
   memory;
   instructions; and
   processor circuitry to execute the instructions to at least:
      calculate first localization information and first confidence information for first potential object patches in a first frame of a plurality of video frames;
      calculate second localization information and second confidence information for second potential object patches in an adjacent frame of the first frame in the plurality of video frames;
      detect paired patches between the first frame and the adjacent frame based on a comparison of the first potential object patches and the second potential object patches; and
      modify a first prediction result for a first paired patch in the adjacent frame, the first prediction result including a first confidence score associated with an object type, the first prediction result to be modified to correspond to a second prediction result of a corresponding second paired patch in the first frame having a second confidence score that is higher than the first confidence score of the first prediction result of the first paired patch in the adjacent frame.

2. The apparatus of claim 1, wherein the processor circuitry is to iteratively modify (i) a third prediction result in a third paired patch of a frame adjacent to the adjacent frame (ii) a fourth prediction result corresponding to a fourth paired patch in a previous frame.

3. The apparatus of claim 1, wherein the processor circuitry is to detect the first paired patch in the adjacent frame based on a color of an object.

4. The apparatus of claim 1, wherein the processor circuitry is to detect the second paired patch in the adjacent frame based on a shape of an object.

5. The apparatus of claim 1, wherein the processor circuitry is to cache localization information and confidence information for the second potential object patches in the adjacent frame in a score cache for use by the processor circuitry in subsequent frames.

6. The apparatus of claim 1, wherein the adjacent frame includes an object with at least one of a motion blur, a video defocus, or a partial occlusion.

7. The apparatus of claim 1, wherein the processor circuitry is to implement one or more convolutional neural networks to calculate the first localization information, the first confidence information, the second localization information and the second confidence information.

8. The apparatus of claim 1, wherein the processor circuitry is to implement at least one of region proposal network (faster R-CNN) detectors, region-based fully convolutional network (R-FCN) detectors, single-shot multibox (SSD) detectors, or you only look once (YOLO) detectors.

9. The apparatus of claim 1, wherein the processor circuitry is to implement a Siamese convolutional neural network to detect the paired patches between the first frame and the adjacent frame.

10. A method for detecting objects in video frames, the method comprising:
    calculating, by executing an instruction with a processor, a localization information and a confidence score for each potential object patch in a first frame and a second frame of a pair of adjacent frames of video from a video camera;
    detecting, by executing an instruction with the processor, paired patches in the adjacent frames based on a detected similarity between the paired patches; and
    modifying, by executing an instruction with the processor, the confidence score associated with an object type of a patch in the first frame based on the localization information and a score cache; and
    enhancing, by executing an instruction with the processor, a paired confidence score of a patch in the second frame based on a similarity detection result.

11. The method of claim 10, including performing a local search pairing to generate potential object patches in the second frame in response to not detecting any potential object patch for an object in the second frame.

12. The method of claim 10, including filtering the patches of the second frame to be compared, the filtering based on the localization information and the confidence score from the first frame.

13. The method of claim 10, wherein the enhancing of the paired confidence score includes generating an enhanced confidence score for each detected paired object in the second frame based on a comparison of the localization information and the confidence score from the second frame and the modified confidence score of the patch in the first frame.

14. The method of claim 10, wherein the modifying of the confidence score includes comparing the confidence score from the first frame with a maximum confidence score in the score cache and selecting a higher value as the modified confidence score for the paired patch in the first frame.

15. The method of claim 10, wherein the calculating of the localization information and a confidence score is based on a calculated multi-loss that is backward propagated.

16. The method of claim 10, including updating the score cache to include the localization information and an enhanced confidence score associated with the paired patch in the second frame.

17. The method of claim 16, including using the enhanced confidence score and associated localization information stored in the score cache to modify prediction results of the first frame in a subsequent iteration.

18. The method of claim 10, wherein the detecting of the paired patches includes detecting default bounding boxes having a higher confidence score in the first frame to generate a paired box.

19. The method of claim 10, wherein the detecting of the paired patches includes, for each of a plurality of detected default bounding boxes with higher confidence scores, detecting a plurality of associated potential object patches in the second frame using local search pairing.

20. A system for detecting objects in video frames, the system comprising:
means for receiving a plurality of video frames from a video camera;
means for calculating localization information and confidence information for each potential object patch in a first frame of the plurality of video frames;
means for calculating localization information and confidence information for each potential object patch in an adjacent frame of the first frame in the plurality of video frames;
means for detecting paired patches between the first frame and the adjacent frame based on a comparison of a first bounding box in the first frame to (i) a second bounding box in a corresponding position in the adjacent frame, and (ii) a third bounding box in a second position that borders the second bounding box; and
means for modifying a first prediction result for a paired patch in the adjacent frame to a second prediction result of a corresponding paired patch in the first frame having a higher confidence score than the first prediction result of the paired patch in the adjacent frame.

21. The system of claim 20, wherein the means for calculating localization information and confidence information for each potential object patch in the adjacent frame is to generate a plurality of potential object patches based on a potential object patch in the first frame in response to not detecting any potential object patch for an object in the adjacent frame.

22. The system of claim 20, wherein the means for modifying the first prediction result is to iteratively modify (i) the first prediction result in one or more paired patches of one or more frames adjacent to the adjacent frame (ii) the first prediction result corresponding to a paired patch in a previous frame.

23. The system of claim 20, wherein the means for detecting the paired patches is to detect the paired patch in the adjacent frame based on a color of an object.

24. The system of claim 20, wherein the means for detecting the paired patches is to detect the paired patch in the adjacent frame based on a shape of an object.

* * * * *